Jan. 13, 1970    R. A. KLANKE    3,489,456
CARGO COMPARTMENT COVER FOR PICKUP TRUCK
Filed May 8, 1968    2 Sheets-Sheet 1
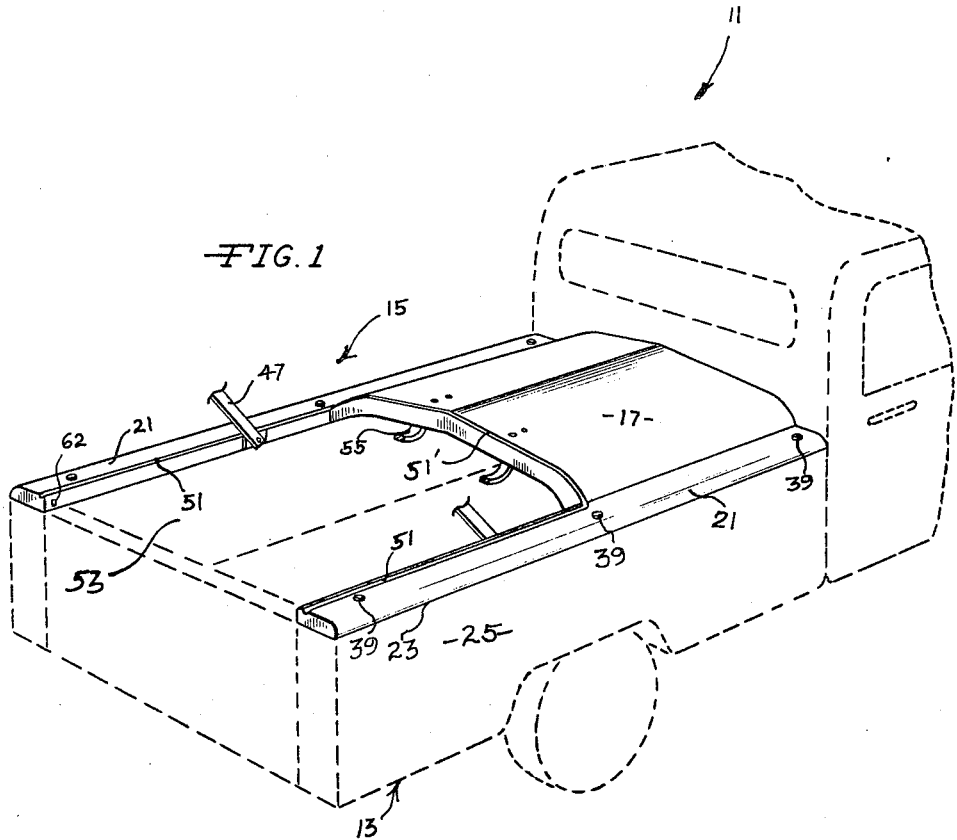
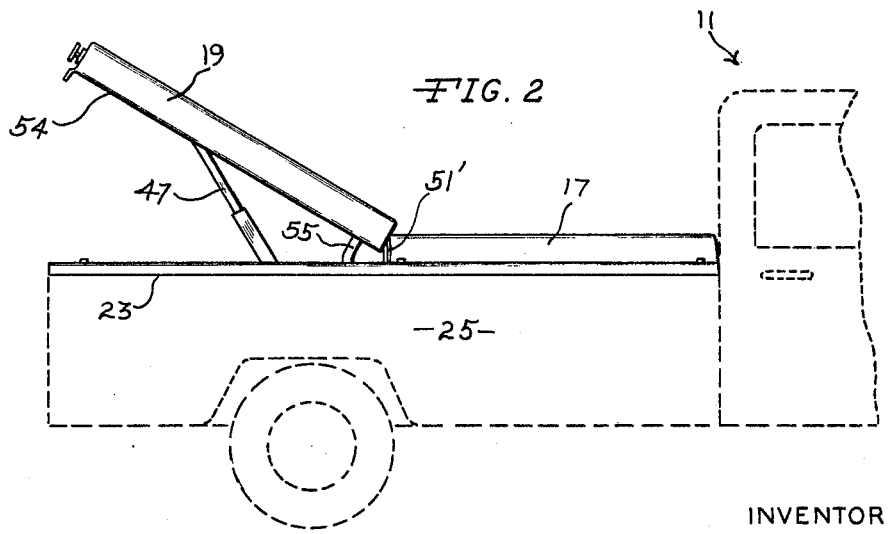
INVENTOR
ROY A. KLANKE
BY
Miller Morris Pappas & McLeod
ATTORNEYS Jan. 13, 1970          R. A. KLANKE          3,489,456
CARGO COMPARTMENT COVER FOR PICKUP TRUCK
Filed May 8, 1968                                2 Sheets-Sheet 2

INVENTOR
ROY A. KLANKE
BY
*Miller Morris Pappas & McLeod*
ATTORNEYS

United States Patent Office 3,489,456
Patented Jan. 13, 1970

3,489,456
CARGO COMPARTMENT COVER FOR PICKUP TRUCK
Roy A. Klanke, 11901 Kaeding Road,
Romeo, Mich. 48065
Filed May 8, 1968, Ser. No. 727,617
Int. Cl. B60j 7/12; B60p 7/02
U.S. Cl. 296—100           7 Claims

ABSTRACT OF THE DISCLOSURE

A cover structure to enclose the open cargo compartment of a pickup truck. The cover structure includes a door which may be raised or lowered to allow loading or unloading of the pickup bed. The cover structure is secured to the stake pockets of the cargo compartment side walls by a special expansion catch mechanism, inserted into the pockets. The door or lid structure is formed to engage with the cover in a weather-tight engagement, and is hinged thereto by specially formed hinge arms which facilitates smooth operation of the door. Handle operated latch means are provided to secure the lid portion closed.

SUMMARY OF THE INVENTION

Structures are known for the enclosure of the rear bed of a pickup truck. For example U.S. Letters Patent No. 3,051,523 shows a counter balanced truck bed lid which is openable and closeable over the cargo compartment. In this particular apparatus, the cover structure is articulated near the forward end of the cargo compartment, and access to the compartment is accomplished by engagement and dis-engagement of the entire cover structure with the side walls of the truck compartment. U.S. Letters Patent No. 3,012,814 also discloses a cover structure articulated for opening and closing in its entirety over the open truck bed. This latter reference also contemplates connection of the structure to post or stake pockets on the pickup compartment.

My invention introduces a closure apparatus in which a portion of the structure remains attached to the compartment sides, by connection to the stake pockets provided on the sides. The cover is provided with a portal from which a door is hung for quick and easy access to the compartment, without disconnection of the entire cover structure from the trunk sides. Co-operating configurations are formed in the cover and door at the engaging regions thereof, to provide a tight closure. This closure does not depend upon the difficult to achieve close mating relationship between the closure apparatus and the truck compartment sides. Thus, in the devices as exemplified by the above cited disclosures, effort may be expended in securing the cover structure into acceptably weathertight connection to the sides of the compartment, but all the effort must be repeated everytime the lid is opened and then re-closed. Furthermore, repeated openings and closings introduce a certain sloppiness into the closure structure such that the effectiveness of the closure gradually diminishes. In my apparatus the connection of the structure to the compartment is securely accomplished once only, and is left in this relation; a separate door is provided for compartment access. The lid is pre-designed to fit tightly to the stationary cover structure. Both are uniform, whereas some variation occurs in trunk designs, which means that once a cover is well connected thereto, it is very desirable to leave it so connected. The door and cover are uniformly prefabricated to match, of course, and thus are adapted for easy and effective repeated closures.

My lid is articulated to pivot on an extended radius so as to approach the cover structure from a greatly minimized angle, when closing thereagainst. This further augments the smoothness of engagement of the door into the mating cover structure, during door operation. The door being smaller than the entire cover, it presents less weight to be lifted to gain access to the compartment.

The present invention also provides braces for the lid whereby the lid may be retained in the up position, and the cover structure is adapted for connection to the stake pockets on the side walls of a pickup truck, by a special expandable catch mechanism.

The lid is securely closed by handle means which actuate lock bars into latch pockets on the cover structure.

Accordingly it is an object of the present invention to provide a novel pickup truck box cover which connects in tight engagement to the side walls of the truck box, and is provided with separate door means for access to the box compartment without interruption of the often difficult to achieve close connection of the cover to the truck.

Another object of the present invention is to provide a pickup truck cover which is more easily opened and closed than are box covers known to the present art.

Still another object of the present invention is to teach a truck box cover structure which is easily and reliably affixed to the side walls of a pickup box.

Yet another feature of the present invention is to introduce a pickup truck cover which may be easily and quickly opened for access to the truck box, and equally easily closed and firmly secured in a weather-tight relation without the necessity of undue manual manipulation.

A still further object of the present invention is to teach a pick-up box cover which easily and quickly opens and closes into weather-tight relation, without interference with opening and closing of the truck tail gate.

A still further object of the present invention is to teach a particular frictional expanding catch means for connection of the cover apparatus to stake pockets on the pick-up box walls.

A still further object of the present invention is to teach a simple design of pickup box cover, which enhances the truck appearance and yet is simultaneously capable of simple and inexpensive construction.

Another object is to teach a cover door which is quick and simple to operate, and is especially light weight to manipulate.

Even further objects of the present invention will be readily apparent to those skilled in the art, upon examination of the present specification, drawings and claims.

IN THE DRAWINGS

FIGURE 1 is a perspective view of a pickup truck in association with a pickup box cover of the present invention, with the box door or lid removed to show the connection of the lid braces and lid hinges to the box cover structure.

FIGURE 2 is a side elevation view of the pickup cover of the present invention, shown in use on a pickup truck, with the cover lid supported by collapsible braces, in the open position.

DESCRIPTION OF PREFERRED EMBODIMENT

Figure 3:
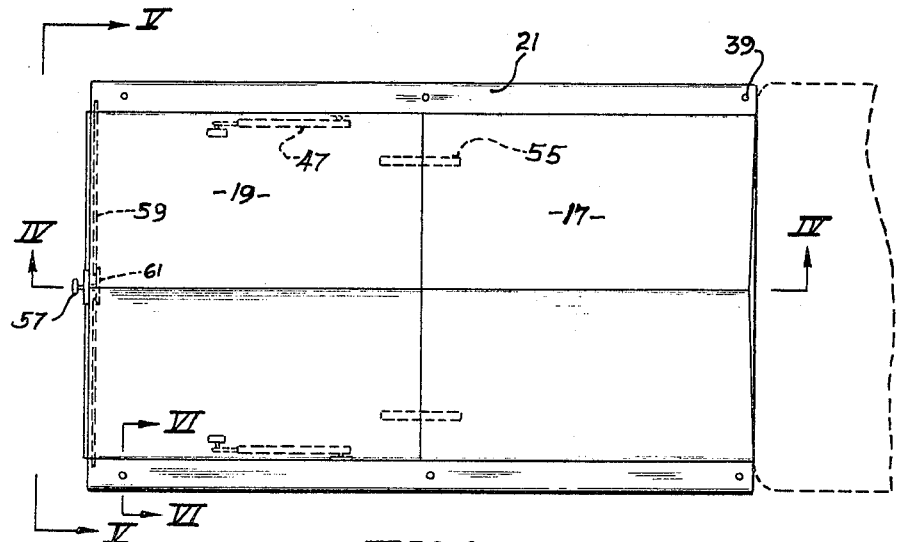
FIGURE 3 is a top plan view of the pickup cover of the present invention, showing in broken line the interior braces and hinges for the cover door.

The present invention relates to a top cover for the rear cargo compartment of a pick-up type of automotive vehicle. Many of these truck cargo compartments are of substantially standardized dimensions and consequently a single size cover may be utilized with a large number of such truck designs or models. The present invention is specifically designed to give a cover structure which is attachable to the side walls of the pickup cargo compartment. FIGURE 1 shows such a truck 11 in broken line. The complete cover structure attached to the cargo compartment 13 is denoted generally by the numeral 15. The enclosure structure 15 is comprised of two basic portions, a cover portion 17, and a door or lid member 19 (see FIGURES 2 and 3). Preferably the external outline of the entire closure apparatus is uniform both on the cover portion 17 and the lid portion 19, and is formed into a peak shape at 18, which delivers both an eye pleasing design, as well as an advantageous self-draining feature for precipitation; rain or snow will tend to slide off the inclined surfaces.

Figure 6:
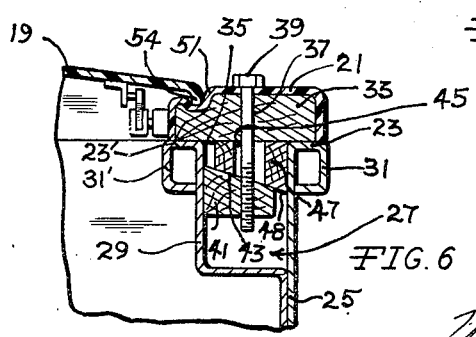
FIGURE 6 is a partial section view of the cover fastening structure for the present invention, taken on lines VI—VI of FIGURE 3.

The outer most edges of the enclosure structure comprises an attachment flange portion 21 which rests in firm abutment against the top 23 of the compartment side walls 25. The base structure of the cover is affixed to the side walls of the pickup box by the attachment flange 21, in the fashion now to be described. Connection of the flange is made to the wall 13 at the pockets 27 normally placed at spaced intervals along the compartment side walls by the truck manufacturer for insertion of stakes or posts (not shown) to vertically extend the compartment walls (see FIGURE 6). The pockets 27 are formed between the outer compartment wall 25 and an extra wall element 29, interiorly of the truck box. Both walls are rolled into box sections 31 and 31' at their top edges to give a flat surface thereat, as well as additional strength against deformation. The base cover flange 21 is seen in FIGURE 6 to be rigidified by a stiffening filler member or material, for example the wood element 33, which provides a continuous, smooth, lower surface 35 resting in an extended, weather sealing contact with the upper surfaces 23 and 23', of the compartment wall. Various means of affixing the flange 21 to the compartment wall 25 may be utilized; a particularly useful apparatus is now described:

The attachment member 21 is provided with a bolt hole 37 and threaded bolt 39. Threaded to the lower end of the bolt is a lower, wedged catch member 41, preferably dimensioned to have a vertical surface in steadying contact against one of the inner faces of the walls of the pocket 27, This arrangement will orient the bolt to a substantially vertical position. The lower wedge surface 43 on member 41, which faces the open end of the pocket 27, is inclined to the right, in the figure, away from the pocket opening. Intermediate the lower catch element 41 and the surface 35 of the attaching member, is interposed a second wedge member 47 with an oversize bolt hole 45 through which the bolt 39 extends. The member 47 has an upper surface in substantially flat engagement against the pocket engaging surface 35 of the attaching member. The other face 48 of the wedge member 47 is inclined away from the pocket opening in the same sense as the surface 43 of the lower member 41, with the two inclined surfaces disposed in substantial planar contact. Screw tightening the bolt 39 into the member 41 lifts the member 41 to compress the member 47 against the attaching surface 35. This action tends to squeeze the upper wedge member 47 laterally away from the wall stabilized member 41, toward the opposite pocket wall 25. This lateral wedge motion of member 47 is accommodated by the oversize hole 45, and under sufficient tightening of bolt 39 the member 47 translates against the pocket wall 25 which effects an opposite expansion of the members 41 and 47 against the walls of the pocket. The expansion against the pocket may be intensified by the bolt 39 to give a sufficient frictional engaging force to retain the attaching member (i.e. the cover structure) in abutment against the upper face of the compartment walls.

Several such connecting stations are provided as seen by the several bolts 39 in FIGURE 1. As many connecting points may be provided as there are stake pockets on the truck box sides. Although some effort may be required to position the cover and tighten it securely to the compartment, the connection thus achieved is a very secure one and need not be broken to gain access to the compartment.

Figure 4:
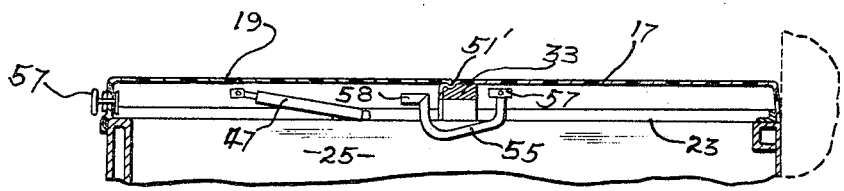
FIGURE 4 is a sectional view of the pickup cover of the present invention, taken at lines IV—IV of FIGURE 3.

The lid 19 is supported aloft by the releasable, telescoping braces 47 which fold into the closed compartment when the structure is closed, as seen in FIGURE 4.

By reference to FIGURE 1 can be seen a closure groove 51 formed along the lateral sides of the cover opening or portal 53. The forward edge of the portal is provided with a similar groove 51' which follows the peaked cover contour. The downturned edge 54 of the lid 19 is provided around the portal engaging edges of the cover 19, and the engagement of the edge 54 with the grove 51 may be seen in detail by reference to FIGURE 6. A similar engagement is accomplished at the front groove 51', when the lid 19 is closed. This engagement gives a seal against entry of the elements from the exterior, and thereby protects the cargo.

To accomplish a smooth seating of the cover into the grooves without binding, the lid 19 is disposed to swing closed onto the base cover structure at a relatively low angle therewith i.e., in a relatively flat approach. This is accomplished by the hinge arms 55 pivoted at 57 to the cover structure 17, somewhat forwardly of the portal groove 51' (see FIGURE 4). This effectively extends the radius on which the lid 19 swings during closure, so that the lid approaches the cover structure in a somewhat more flat, or straight on, approach than if it were pivoted precisely at the point of closure near the groove 51'. The hinge arms 55 are specifically configured to connect at the spaced back point 57, and are also flared away from the area of the groove 51', so as to clear the groove 51' and adjacent cover structure, when the lid 19 is opened (again see FIGURE 4). The hinge 55 is connected at 58 to the underside of the lid 19. Thus the lid approaches the cover in a nearly flat, head on orientation, which gives a more nearly vertical, or "dropping" effect, of the lid edges into the groove structures 51 and 52'.

Without this described radial extension, the lid 19 would swing into the groove 51' at a sharper angle (i.e. in a smaller arc) and fail to clear the upper, forward edge of the groove 51'. Furthermore, conventional hinging, closer to the door crack, would be mechanically difficult to implement due to the interfering groove structure 51'. Acordingly, the flared, spaced back hinge is here utilized as a very workable solution to these problems.

Figure 5:
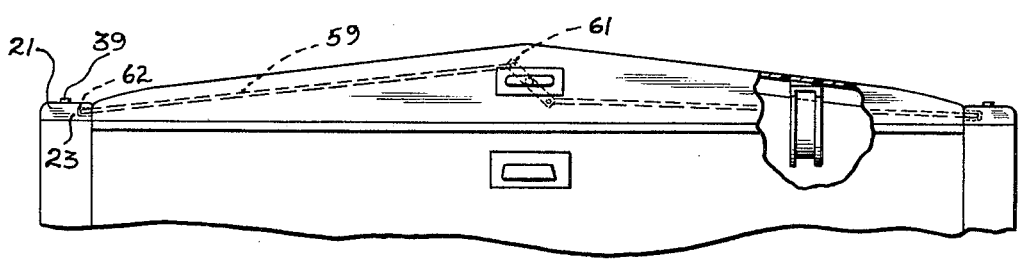
FIGURE 5 is a rear elevation view of the pickup cover of the present invention on a pickup truck taken at lines V—V of FIGURE 3, showing the tail gate thereof and having a portion broken away to show the orientation of a lid hinge.

The lid or door 19 is easily and quickly opened and closed since it does not involve disconnection of one or more points of the entire cover structure from the truck compartment. FIGURE 5 shows a practical lid locking device, consisting of the rotary lift handle 57 (see FIGURE 3) and lock rods or pins 59 connected to the ends of radial expander 61. The rods 59 are thrust outwardly by the expander 61 which turns with handle 57. The rods thus expand into lock recesses 62, and hold the lid securely closed.

Having described an operative embodiment of my invention, others will perceive therefrom obvious modifications, adaptations and substitutions, all of which are to be included with the spirit of the invention.

I claim:

1. In a weatherproof cover member for the cargo compartment of a pickup truck, the combination comprising:

(a) a cargo compartment cover member extending from the forward wall of said cargo compartment, said cover member provided with longitudinally extending flange portions along each side thereof, said flange portions extending rearwardly to the rear wall of said cargo compartment, said flange portions engaging the side walls of a cargo compartment, said cover member and rearward extensions of said flange portions and said rear wall defining a lid-receiving opening therethrough;

(b) an upwardly-opening lid member hingeably connected at the forward end thereof to the rear end of said cover member, said lid member adapted upon movement to a substantially horizontal closure position to engage said cover member and said rearward extensions of said flange portions and said rear wall so as to form a weatherproof covering for the cargo compartment.

2. The apparatus set forth in claim 1, wherein said lid member is articulated by a structure comprising:
at least one hinge arm connecting said lid member to a point on said cover spaced somewhat away from said edge of said portal, with said hinge arm formed to clearingly circumvent the intermediate line of juncture between said cover and said lid member.

3. The apparatus set forth in claim 2 with the additional structure comprising:
at least one collapsible brace disposed between said cover and said lid member to releasably hold said door in an opened position.

4. The apparatus of claim 3 wherein said cover and said lid member have a uniformly peaked transverse cross sectional profile, for a precipitation shedding effect.

5. In a weatherproof cover member for the cargo compartment of a pickup truck, the combination comprising:
(a) a cargo compartment cover member extending from the forward wall of said cargo compartment, said cover member provided with longitudinally extending flange portions along each side thereof, said flange portions extending rearwardly to the rear wall of said cargo compartment, said flange portions engaging the side walls of a cargo compartment, said cover member and rearward extensions of said flange portions and said rear wall defining a lid-receiving opening therethrough;
(b) an upwardly-opening lid member hingeably connected at the forward end thereof to the rear end of said cover member, said lid member adapted upon movement to a substantially horizontal closure position to engage said cover member and said rearward extensions of said flange portions and the rear wall of said cargo compartment so as to form a weatherproof covering for the cargo compartment; and
(c) latch means provided on the rear end of the lid opposite said forward hinged end, said latch means lockable engaging at least one of the rearward extensions of said flange portions so as to selectively maintain said lid in a locked horizontal closure position.

6. The apparatus set forth in claim 5 wherein the latch means comprise:
a rotary handle mounted by a shaft portion to said lid member and having at least one radial arm portion extending from said shaft interiorly of said lid member;
at least one lock recess formed in said cover, adjacent an edge of said portal, and opening toward said radial arm; and
at least one lock bar having one end attached to said radial arm and the other end adjacent said lock recess, so that rotation of said handle extends said lock bar into said recess.

7. The apparatus of claim 5 wherein a means for engaging said cover to said cargo compartment comprises:
vertically opening pockets on the sides of said cargo compartment;
threaded bolt means depending from said cover into said pockets;
a first wedge member in each of said pockets and having a threaded hole with said bolt means threadedly engaged therein;
a second wedge member disposed on an oversize hole portion over said bolt, between said cover and said first wedge member, with the inclined faces of said wedge members in abutting contact;
whereby tightening of said bolt head separates said wedge members for an expansion connection to said side pockets.

References Cited

UNITED STATES PATENTS

| | | | |
|---|---|---|---|
| 2,045,489 | 6/1936 | Payette | 296—100 |
| 2,690,351 | 9/1954 | Giles | 296—43 |
| 2,918,840 | 12/1959 | Roesler | 105—369 |
| 2,929,528 | 3/1960 | Hoag | 296—106 |
| 3,303,949 | 2/1967 | Nickel | 296—76 |
| 2,909,387 | 10/1959 | Burtzloff | 296—100 |

LEO FRIAGLIA, Primary Examiner

R. R. SONG, Assistant Examiner